US008520747B2

(12) United States Patent
Sampath et al.

(10) Patent No.: US 8,520,747 B2
(45) Date of Patent: Aug. 27, 2013

(54) CHANNEL ESTIMATION IN WIRELESS SYSTEMS WITH IMPULSIVE INTERFERENCE

(75) Inventors: Ashwin Sampath, Princeton, NJ (US); Husheng Li, Knoxville, TN (US)

(73) Assignee: QUALCOMM Incorporated, San Diego, CA (US)

( * ) Notice: Subject to any disclaimer, the term of this patent is extended or adjusted under 35 U.S.C. 154(b) by 700 days.

(21) Appl. No.: 12/052,429

(22) Filed: Mar. 20, 2008

(65) Prior Publication Data
US 2009/0238289 A1 Sep. 24, 2009

(51) Int. Cl.
*H04K 1/10* (2006.01)
(52) U.S. Cl.
USPC .......................................................... 375/260
(58) Field of Classification Search
USPC .................................. 375/226, 260, 267, 285
See application file for complete search history.

(56) References Cited

U.S. PATENT DOCUMENTS

| | | | | |
|---|---|---|---|---|
| 7,369,606 | B1 * | 5/2008 | Ertel et al. ..................... | 375/226 |
| 2003/0210749 | A1 * | 11/2003 | Asjadi ............................ | 375/260 |
| 2005/0180364 | A1 * | 8/2005 | Nagarajan et al. ............ | 370/335 |
| 2006/0062322 | A1 * | 3/2006 | Namgoong et al. .......... | 375/285 |
| 2007/0036179 | A1 | 2/2007 | Palanki et al. | |
| 2009/0252249 | A1 * | 10/2009 | Kim et al. ..................... | 375/267 |
| 2010/0150079 | A1 * | 6/2010 | Maltsev et al. ............... | 370/329 |

FOREIGN PATENT DOCUMENTS

| | | |
|---|---|---|
| CN | 101115046 A | 1/2008 |
| JP | 2006229915 A | 8/2006 |
| KR | 100508115 | 8/2005 |
| WO | WO2006124810 A2 | 11/2006 |
| WO | WO2007021796 A2 | 2/2007 |
| WO | 2007064131 A1 | 6/2007 |
| WO | 2007091908 A1 | 8/2007 |

OTHER PUBLICATIONS

International Search Report/Written Opinion—PCT/US09/036085—International Search Authority EPO—Jan. 13, 2010.
Josiam, et al: "Bandwidth efficient channel estimation using superimposed pilots in OFDM systems," IEEE Transactions on Wireless Communications, vol. 6, No. 6, Jun. 1, 2007, pp. 2234-2245, ISSN: 1536-1276, figure 2.
Zhang, et al: "Robust adaptive channel estimation of OFDM systems in time-varying narrowband interference," IEEE, May 23, 2005, pp. 1722-1725, ISBN: 978-0-7803-8834-5, p. 1723, section 3, p. 1724, section 4, abstract.
Taiwan Search Report—TW098108975—TIPO—Oct. 8, 2012.

* cited by examiner

*Primary Examiner* — Leon-Viet Nguyen
(74) *Attorney, Agent, or Firm* — James K. O'Hare

(57) ABSTRACT

Systems and methodologies are described that facilitate detecting impulsive interference of pilot signals in wireless communications networks and accounting for such interference in estimating data channels to decode the pilot signals. Portions of a received pilot signal can be compared to other portions to create correlated subsets of similar portions. The number of portions in a subset can indicate a high likelihood of non-interference, and portions that are not in the subsets can be disregarded or weighted less in estimating channels for decoding. In cases of ambiguous subsets or portions, one or more subsets/portions can each be used to estimate the channel and data can be decoded multiple times. The decoding that results in a higher decoding metric can be selected. Additionally, systems and methodologies for inserting pilot signals within data are described.

16 Claims, 11 Drawing Sheets

CHANNEL ESTIMATION IN WIRELESS SYSTEMS WITH IMPULSIVE INTERFERENCE

BACKGROUND

I. Field

The following description relates generally to wireless communications, and more particularly to protecting pilots from impulsive interference in wireless communication systems.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in a peer-to-peer or ad hoc wireless network configuration.

MIMO systems commonly employ multiple ($N_T$) transmit antennas and multiple ($N_R$) receive antennas for data transmission. The antennas can relate to both base stations and mobile devices, in one example, allowing bi-directional communication between the devices on the wireless network. In an OFDMA wireless network, mobile devices and/or base stations can transmit data using one or more subcarriers, or tones, of an OFDM symbol. When multiple base stations and mobile devices are present and transmitting data at the same or near the same time intervals and frequency, interference occurs, with respect to receiving the transmissions. To aid in coherently demodulating data in light of unknown channel variations and the aforementioned interference, a reference signal (e.g., a pilot signal), which is typically known to the receiver, is transmitted using a portion of OFDM symbol-subcarrier grid. The pilot signal is typically utilized by the receiver to determine the extent of the noise, interference, and/or translation with respect to a channel used to transmit the data on the OFDM symbols.

In typical wide-area cellular wireless systems, the interference observed persists for a period of time and comes from several interferers with no single interferer being overly dominant. Aspects of the interferers make them appear as white Gaussian noise at a receiver, which can be accounted for by using techniques such as linear filtering. Increasingly deployed ad hoc networks (e.g., hot-spots, home base stations, Femto cells, peer-to-peer, etc.), which facilitate direct device communication without consideration of whether there is a more optimal serving link as in the typical wide-area cellular wireless deployments. Because more optimal serving links can exist without being utilized in the ad hoc deployments, there is a much greater likelihood of dominant interference from the more optimal serving link (or to the more optimal serving link). Moreover, the interference cannot always be averaged as interfering devices may not always have high activity levels. Thus, the interference is impulsive in many cases with respect to timing and degree.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating pilot protection from impulsive interference in ad hoc wireless communications networks. In particular, portions of a received signal can be compared to other portions to determine a correlated subset. Portions that are not in the subset can be presumed to have high interference where the size of the subset is sufficiently greater than the outlying portions. Additionally, redundant and diverse pilot insertion is provided to effectuate the pilot protection and interference detection.

According to related aspects, a method for channel estimating in a wireless communications network is provided. The method includes detecting existence of interference on one or more portions of a received signal. Moreover, the method comprises estimating one or more channels based at least in part on the detection of one or more interfered portions of the received signal.

Another aspect relates to a wireless communications apparatus. The wireless communications apparatus can include at least one processor configured to detect impulsive interference on a portion of a received signal and estimate data channels based at least in part on the detected interference. The wireless communications apparatus can also include a memory coupled to the at least one processor.

Yet another aspect relates to a wireless communications apparatus that estimates data channels for subsequent decoding. The wireless communications apparatus can include means for determining existence of impulsive interference on a portion of a received signal. The wireless communications apparatus can further include means for estimating one or more data channels based at least in part on the determined interfered portion.

Still another aspect relates to a computer program product, which can have a computer-readable medium including code for causing at least one computer to detect existence of interference on one or more portions of a received signal. The computer-readable medium can further comprise code for causing the at least one computer to estimate one or more data channels based at least in part on the one or more interfered portions of the received signal.

In accordance with another aspect, an apparatus in a wireless communication system can include a processor configured to determine existence of impulsive interference on a portion of a received signal and estimate one or more data channels based at least in part on the interfered portion. Also, the apparatus can include a memory coupled to the processor.

According to a further aspect, a method for multiplexing pilot signals with data in an ad hoc wireless communications network is provided. The method can comprise dividing tones of an OFDM symbol into groups of two tones and encoding data into a number of bits greater than or equal to the number of groups. The method can further include multiplexing at least one bit of the encoded data on each tone of at least one of the two-tone groups along with a pilot signal.

Another aspect relates to a wireless communications apparatus. The wireless communications apparatus can include at least one processor configured to divide tones of an OFDM symbol into groups of multiple tones and multiplex at least one data bit with a pilot signal on the tones of a group. The wireless communications apparatus can also include a memory coupled to the at least one processor.

Yet another aspect relates to a wireless communications apparatus for inserting pilot signals with data in an ad hoc wireless communication network. The wireless communications apparatus can comprise means for dividing tones of an OFDM symbol into at least one group of tones, means for encoding data into a number of bits greater than or equal to the number of groups, and means for multiplexing at least one bit of the encoded data on each tone of at least one group along with a pilot signal.

Still another aspect relates to a computer program product, which can have a computer-readable medium including code for causing at least one computer to divide tones of an OFDM symbol into groups of two tones. The computer-readable medium can also include code for causing the at least one computer to encode data into a number of bits greater than or equal to the number of groups. Furthermore, the computer-readable medium can comprise code for causing the at least one computer to multiplex at least one bit of the encoded data on each tone of at least one of the two-tone groups along with a pilot signal.

In accordance with another aspect, an apparatus can be provided in a wireless communication system including a processor configured to divide tones of an OFDM symbol into at least one group of tones, encode data into a number of bits greater than or equal to the number of groups, and multiplex at least one bit of the encoded data on each tone of at least one group along with a pilot signal. Additionally, the apparatus can comprise a memory coupled to the processor.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
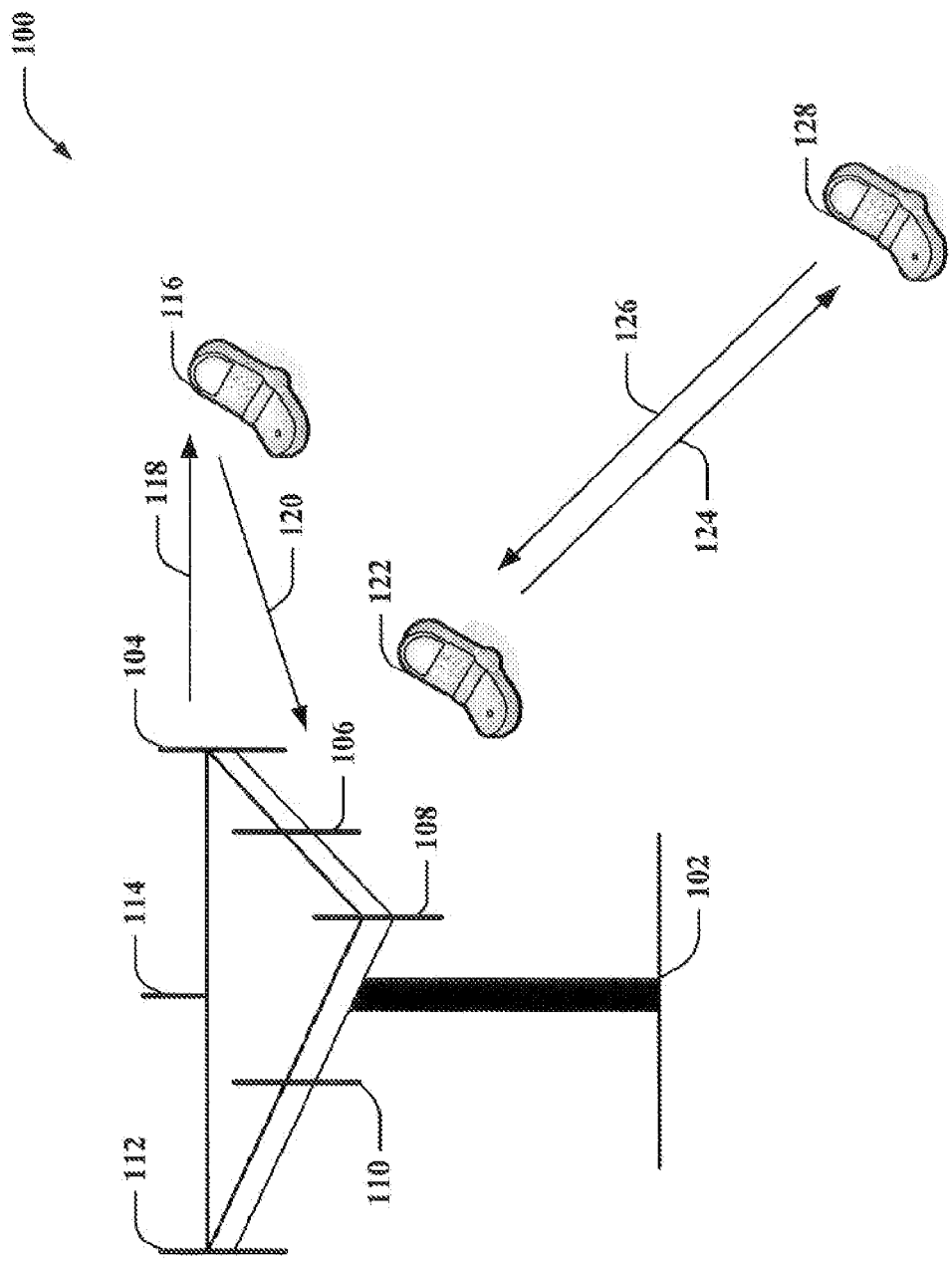
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art. Additionally, the base station 102 can be a home base station, a Femto base station, and/or the like.

Base station 102 can communicate with one or more mobile devices such as mobile device 116; however, it is to be appreciated that base station 102 can communicate with substantially any number of mobile devices similar to mobile devices 116. In addition, mobile devices 122 and 128 can be communicating with one another. Mobile devices 116, 122, and 128 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 104 and 106, where antennas 104 and 106 transmit information to mobile device 116 over a forward link 118 and receive information from mobile device 116 over a reverse link 120. Moreover, mobile device 122 is in communication with mobile device 128 using similar links 124 and 126. In a frequency division duplex (FDD) system, forward link 118 can utilize a different frequency band than that used by reverse link 120, for example. Further, in a time division duplex (TDD) system, forward link 118 and reverse link 120 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward link 118, the transmitting antennas of base station 102 can utilize beamforming to improve signal-to-noise ratio of forward link 118 for mobile device 116. Also, while base station 102 utilizes beamforming to transmit to mobile device 116 scattered randomly through an associated coverage, mobile devices in neighboring cells, or mobile devices not communicating with the base station, such as mobile devices 122 and 128, can be subject to less interference as compared to a base station transmitting through a single antenna to all its mobile devices. Additionally, mobile devices 122 and 128 can communicate directly with one another using a peer-to-peer or technology over links 124 and 126. Moreover, transmissions from mobile device 122 can interfere with the communication between mobile device 116 and base station 102 and vice versa, in one example, due to the proximity. Additionally, because the mobile device 122 is transmitting with the other mobile device 128 using the same or disparate communication technology; the interference can be impulsive, meaning it can vary in given time periods and to different degrees. For example, as there can be a dominant interferer that communicates with devices at random, the interference can be difficult or impossible to predict or average.

According to an example, system 100 can be a multiple-input multiple-output (MIMO) communication system. Further, system 100 can utilize substantially any type of duplexing technique to divide communication channels (e.g., forward link, reverse link, . . . ) such as FDD, TDD, and the like. The mobile device(s) 116, 122, and/or 128 or the base station 102 can transmit a pilot signal, and/or a pilot signal multiplexed with data, on more than one tone of a given OFDM symbol and on several OFDM symbols as needed. A receiver of the transmission can detect presence of strong interference on one or more tones of the OFDM symbol. In one example, the receiver of the transmission can correlate the tones to determine one or more subsets of closely related tones. If multiple subsets are created, the subset having a greater number of tones, for example, can be used to estimate data channels while the other subsets or single tones (e.g., outliers) are discarded. Additionally or alternatively, the subsets can be weighed based on a number of factors, including the number of tones in the subset; the weightings can subsequently be used to form an estimate of the channel from the transmitter to the receiver and use that estimate on the data channels for coherent demodulation and decoding. Where multiple subsets of correlated tones are created having similar metrics (e.g., substantially the same or close to the same number of tones), both subsets can be used for the purpose of channel estimation, and the subset that yields a correct decoding of data on the channels (determined via cyclic redundancy check (CRC) or magnitude of likelihood ratios produced by the decoder) with the higher decoding metric can be chosen for as being the decoded data.

For example, mobile device 116 can be communicating pilot (and/or data-pilot multiplexed) signals to base station 102 using multiple tones of a given OFDM symbol. Mobile device 122 can be communicating with mobile device 128 in a peer-to-peer communication. Mobile device 122 can also be using high power to transmit, for example, and can transmit on one or more similar tones of the same or nearly the same OFDM symbol as mobile device 116 creating interference on the tone with respect to communication between the receiving base station 102 and mobile device 116. The presence of interference, however, is not consistent across all tones, is not always present, and is highly a function of the mobile device 122 and 128 communication. Thus, estimating or averaging the interference across the multiple tones is not effective. Determining one or more correlated subsets of tones, however, can allow the interfered tone(s) to be disregarded or given less weight, for example, when forming a channel estimate prior to decoding received data.

Furthering the example, if tones 1-4 of the OFDM symbol are used for communication from the mobile device 116 to the base station 102, and tones 4-7 of the same or similar OFDM symbol are used by mobile device 122 to communicate with the peer-to-peer mobile device 128, there is interference on tone 4 with respect to the receiving base station 102 as mobile device 122 is physically close to base station 102 but is communicating with a device further away. Thus, averaging the interference over tones 1-4 would yield undesirable results as tones 1-3 are not similarly interfered. Therefore, correlating the tones into one or more subsets can produce a subset of tones 1-3 with an outlier tone 4. The channels can subsequently be estimated for coherently demodulating/decoding data using only the subset of tones 1-3, disregarding tone 4, yielding a more accurate channel estimating than merely averaging the interference across tones 1-4.

Figure 2:
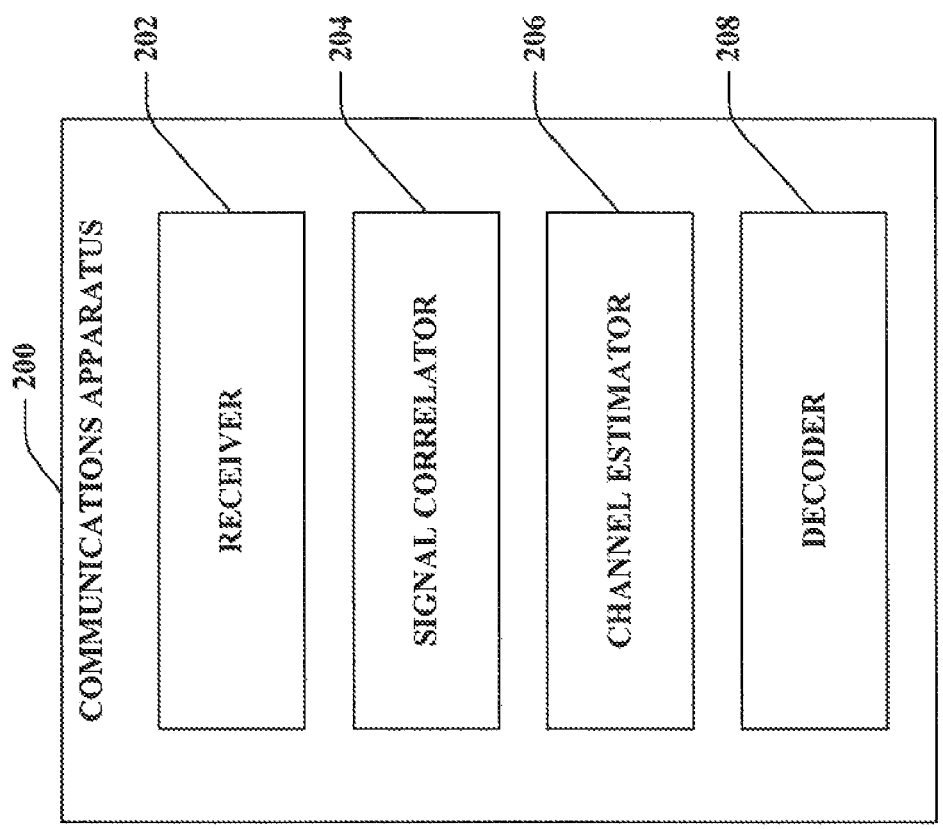
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. The communications apparatus 200 can include a receiver 202 that receives one or more broadcast or transmitted signals, a signal correlator 204 that can group the received signals, or tones thereof, into one or more subsets of correlated signals, a channel estimator 206 that can estimate data channels based at least in part on the subset(s) of correlated signals, and a decoder that decodes the estimated data channels to determine data sent to the communications apparatus 200.

According to an example, the communications apparatus 200 can receive signals representing tones of an OFDM symbol via receiver 202. The signals can be such that they interfere with one another by using similar tones of the OFDM symbol to transmit information. The extent of the interference, however, can vary across tones, such that conventional methods of averaging interference are undesirable or yield incorrect or inefficient channel estimation and decoding. The signal correlator 204 can be used in this regard to compare pilot signals, or tones of the OFDM symbol used to broadcast such, to create subsets of similar or related tones. In some instances, tones singled out as not part of a subset, or subsets having a small number of tones compared to the number of replicated pilot signals, can be considered outliers, and thus, disregarded for channel estimation.

In this example, the channel estimator 206 can evaluate the correlated subset(s) generated by the signal correlator 204 to estimate the channels based at least in part on a probability that a given subset is not subject to interference. The probability of non-interference can be determined in a variety of ways. For example, as mentioned, a subset of tones having a larger number of tones in the subset than other subsets of tones, can imply a high likelihood that the tones in the subset are not subject to substantial interference whereas the other subsets or outlying tones are subject to interference. Thus, the channel estimator 206 can choose the subset of tones with high probability of non-interference for channel estimation while disregarding the other tones. Additionally or alternatively, the tones can be assigned a confidence level, for example, where tones of a certain subset can have a higher confidence, based on a number a factors, than tones of a disparate subset or outlying tones. The confidence levels can be used in appropriately weighting each subset and combining the individual channel estimates from each subset in forming the overall channel estimate.

The decoder 208 coherently demodulates and decodes the data, using the aforementioned channel estimates to discern data sent thereon. Where subsets are ambiguous or have similar metrics, such as close to or the same number of tones in the subset, alternative methods of channel estimation and decoding can be utilized. This can be determined, in one example, if no subset has a sufficient confidence level. For example, the ambiguous subsets can be used to form a channel estimate and can be coherently demodulated and decoded by the decoder 208. Subsequently, the decoded data can be evaluated to determine a decoding metric. The metric can be determined by using one or more checks, such as a parity check, CRC (if included in the data), and/or the like. The data with the highest metric can be utilized as the decoded data. Thus, the alternative method can be used where the efficient method provided above cannot sufficiently determine a high likelihood of non-interference on any of the channels or subsets over other channels or subsets based on comparison.

Figure 3:
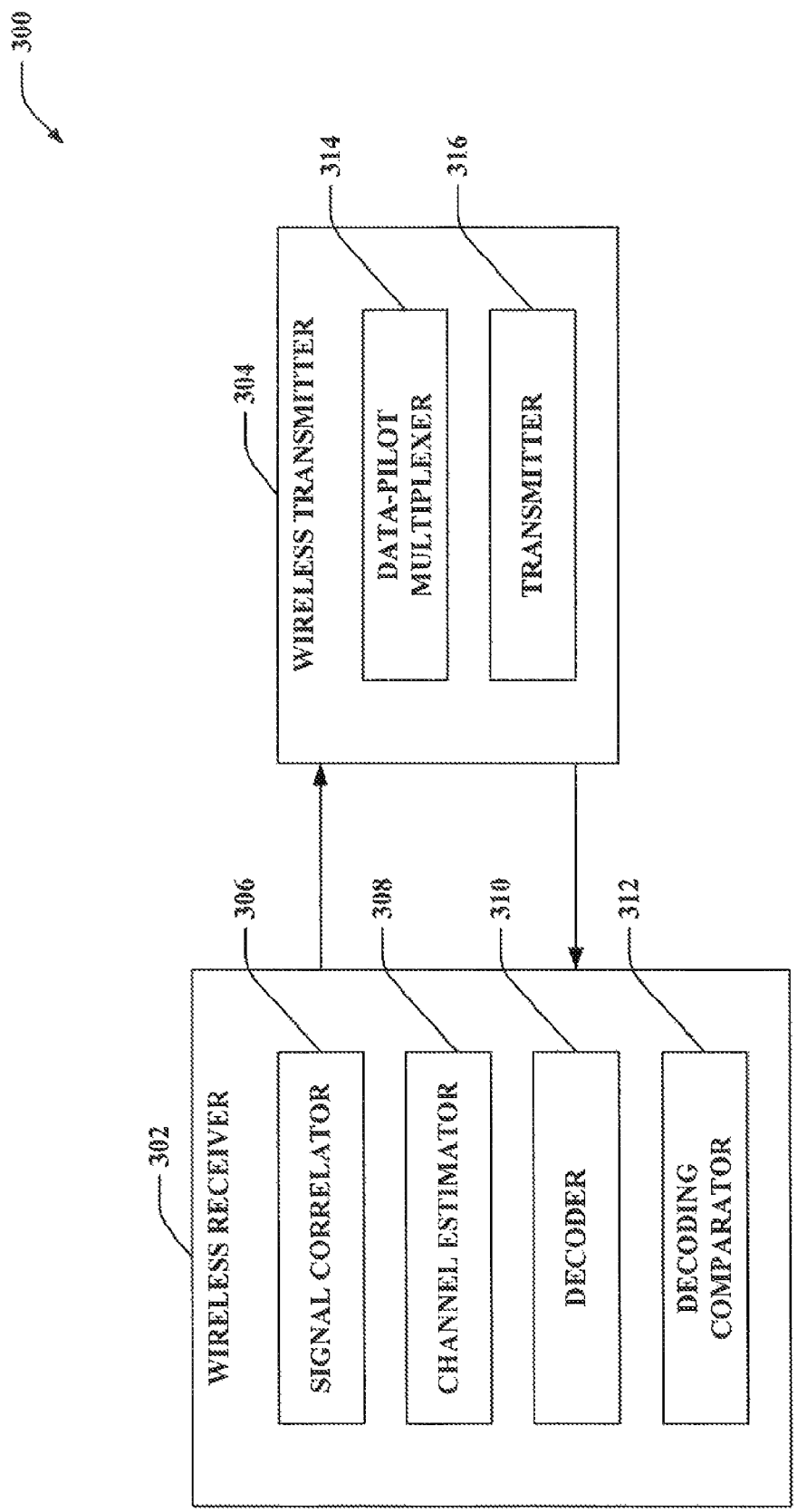
FIG. 3 is an illustration of an example wireless communications system that effectuates decoding impulsively interfered pilot signals.

Now referring to FIG. 3, illustrated is a wireless communications system 300 that effectuates properly receiving and decoding pilot signals by detecting strong interference that can be impulsive in nature. The system 300 includes a wireless receiver 302 that receives communications from a wireless transmitter 304 (and/or any number of disparate wireless transmitters (not shown)). Moreover, system 300 can be a MIMO system. Additionally, the system 300 can operate in an OFDMA wireless network, in one example, where it can participate along with other devices (not shown) that can communicate, near the wireless receiver 302 and wireless transmitter 304, with additional devices causing interference with the wireless receiver 302/wireless transmitter 304 communication. It is to be appreciated that the wireless receiver 302 and/or wireless transmitter 304 can be a base station, mobile device, and/or portions thereof. Additionally, the wireless receiver 302 can incorporate the components of the wireless transmitter 304 and/or vice versa, in one example.

Wireless receiver 302 includes a signal correlator 306 that can compare a number of signals, or associated tones of a given OFDM symbol, to create groups of similar tones, a channel estimator 308 that can estimate the channels for data decoding based on observation of the groups or subsets of similar tones, a decoder 310 that decodes one or more of the estimated channels, and a decoding comparator 312 that can compare decoded data or subsets thereof to determine one having a highest decoding metric if necessary. The wireless receiver 302 can receive and process signals received from the wireless transmitter 304 and account for interference using the aforementioned components as will be described in further detail infra.

The wireless transmitter 304 can comprise a data-pilot multiplexer 314 that can multiplex pilot signals with data to allow multiplexing pilot signals throughout tones of an OFDM symbol, and a transmitter 316 that transmits a pilot signal or a multiplexed data-pilot signal if available. In an example, the wireless transmitter 304 transmits data to the wireless transmitter 302 via the transmitter, but additional transmitters of additional wireless transmitter (not shown) can interfere with the wireless receiver 302/wireless transmitter 304 communication when in close proximity. The components that are described with respect to this figure mitigate this interference to allow effective interpretation of the pilot or data-pilot multiplexed signal.

According to an example, the wireless transmitter 304 can desire to transmit pilot information to one or more receivers, such as wireless receiver 302, to allow the receiver to decode encoded data using the pilot as reference information. In this example, the pilot information is sent on multiple tones of an OFDM symbol to provide for diversity in receiving the pilot information. Accordingly, the pilot information can be multiplexed with data on the same or different tones, using the data-pilot multiplexer 314, to provide some recapture of bandwidth and avoid substantial reduction of data dimension.

In one example, the data can be multiplexed with pilot information by dividing the available tones into groups where the pilot signal can be multiplexed with data within the groups. For example, a number of available tones, m, of an OFDM symbol can be divided into m/2 groups, each group having 2 tones. The information bits can be encoded into m/2 quadrature phase-shift keying (QPSK) symbols, which can be represented by $D_1, \ldots, D_{m/2}$. Then, for each group n, where $n=1, \ldots, m/2$, the following signals can be transmitted on the two tones in the groups:

$$\begin{cases} s_{n1} = D_n + P \\ s_{n2} = D_n - P, \end{cases}$$

which can be sent in the OFDM symbol by the transmitter 316. The base station 302 can separate the data and pilot using addition and subtraction rendering m/2 channel estimates. Therefore, pilot redundancy and diversity is provided that can allow the multiple tones to be correlated as explained below. This is an alternative to using two tones and mapping one each to data and pilot respectively.

The wireless receiver 302, upon separating the data and pilot information, can utilize the signal correlator 306 to compare the pilot data to create subsets of correlated tones related to the pilot data and determine one or more outlying tones. The correlated tones in the subset can be utilized by the channel estimator 308 to estimate the channel and then decode based on the tones in the subset disregarding (or applying less weight to) the outlying tones. The decoder 310 can coherently demodulate and decode the data using channel estimates from the subset determined to be free or of lowest interference from the aforementioned correlation step. Additionally or alternatively, the decoding comparator 312 can be utilized to decode data from multiple subsets of tones or estimated channels and determine a higher decoding metric where the signal correlator 306 generates ambiguous subsets that offer no high probability of non-interference for a given subset over another subset (or a given channel over another channel). Furthermore, channel estimates from different sets may be combined with appropriate weightings that reflect the confidence level of being free of high interference. The channel estimate formed from such combining can then be used for coherently demodulating and decoding the data.

Figure 4:
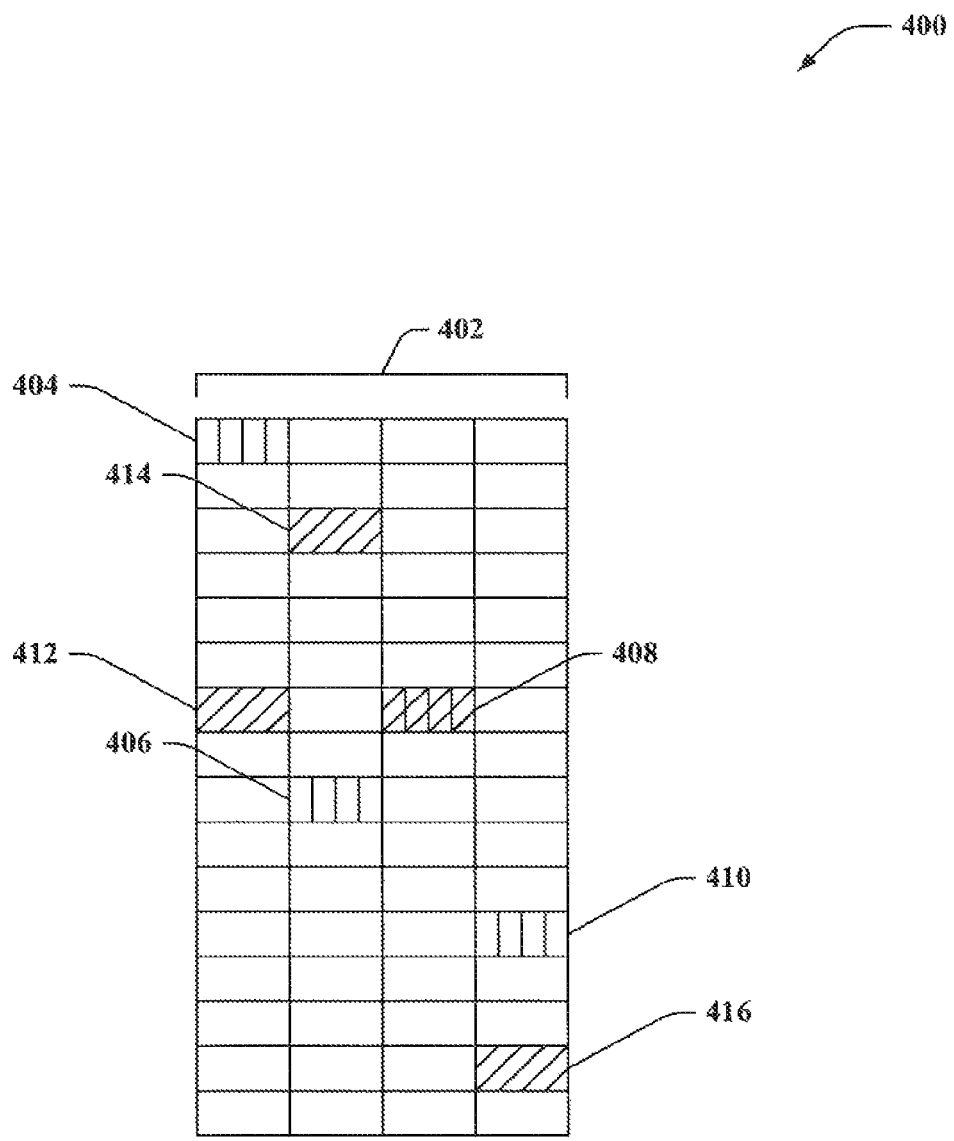
FIG. 4 is an illustration of example OFDM symbols having impulsively interfered tones.

Now referring to FIG. 4, a representation of interfered bandwidth 400 is displayed. The bandwidth is represented by four OFDM symbols 402 each having sixteen subcarriers. It is to be appreciated that more or less OFDM symbols and/or subcarriers within the OFDM symbols can be utilized; this figure is representative of one of substantially limitless configurations for use with the described subject matter. Additionally, the OFDM symbols can represent one or more or a portion of a frame and/or preamble thereof. A device can communicate with another device in a wireless mobile network, as described supra, using the four tones at 404, 406, 408, and 410. Moreover, a disparate device close to the receiving device in the first communication, can transmit data to a disparate device using one or more of the four tones at 412, 414, 408, and 416. Thus, there can be interference on tone 408 for a receiver of the communications.

In this example, the interference is impulsive since it may not always be present, for example if the disparate device is not communicating at the time. When the interference is not present, all 4 tones 404, 406, 408, and 410 would be highly correlated with each other, and, all of the tones of 404 will be in a single subset and can all be used to form a channel estimate. Averaging of the tones in the subset will allow further reduction in any additive noise or weak, independent interference that may be present. However, when the interference is present, the tones 404, 406, 408, and 410 are grouped into correlated subsets yielding tones 404, 406, and 410 in one subset as they are not interfered and compare positively to one another, and tone 408 will be an outlier because of the interference from the other tone set. Thus, tones 404, 406, and 410 will be utilized in channel estimation and subsequent decoding of the data channels and tone 408 is an outlier and therefore can be disregarded. As mentioned, in another example, tones 404, 406, and 410 can be assigned a higher confidence level as they correlate to one another leaving tone 408 with a lower confidence assignment. The tones can then be averaged with respect to their confidence levels such that the estimation is highly in favor of tones 404, 406, and 410. This yields more efficient estimation of data channels than averaging typically performed for white Gaussian noise.

Figure 5:
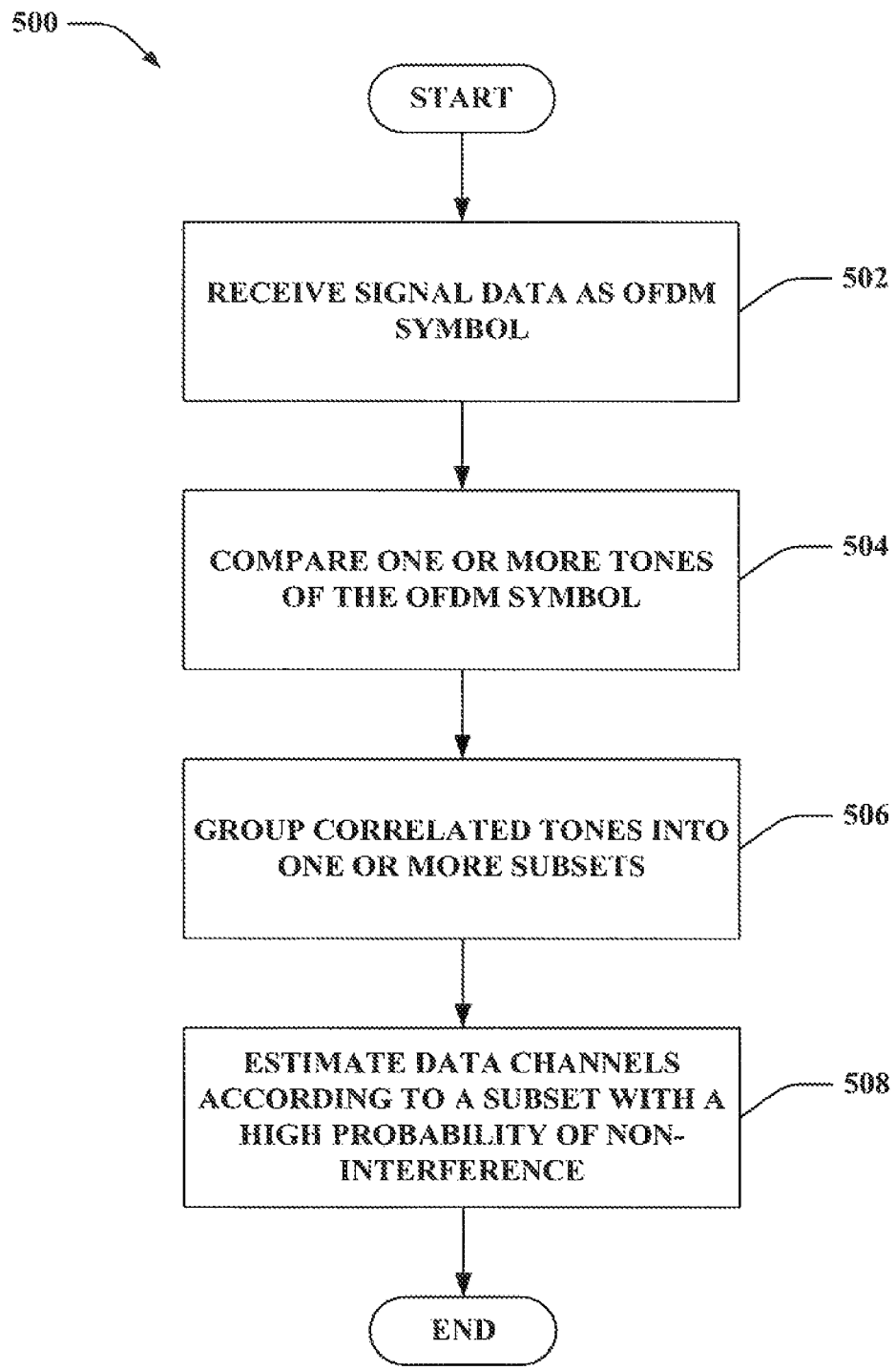
FIG. 5 is an illustration of an example methodology that facilitates estimating data channels in light of impulsive interference.
Figure 6:
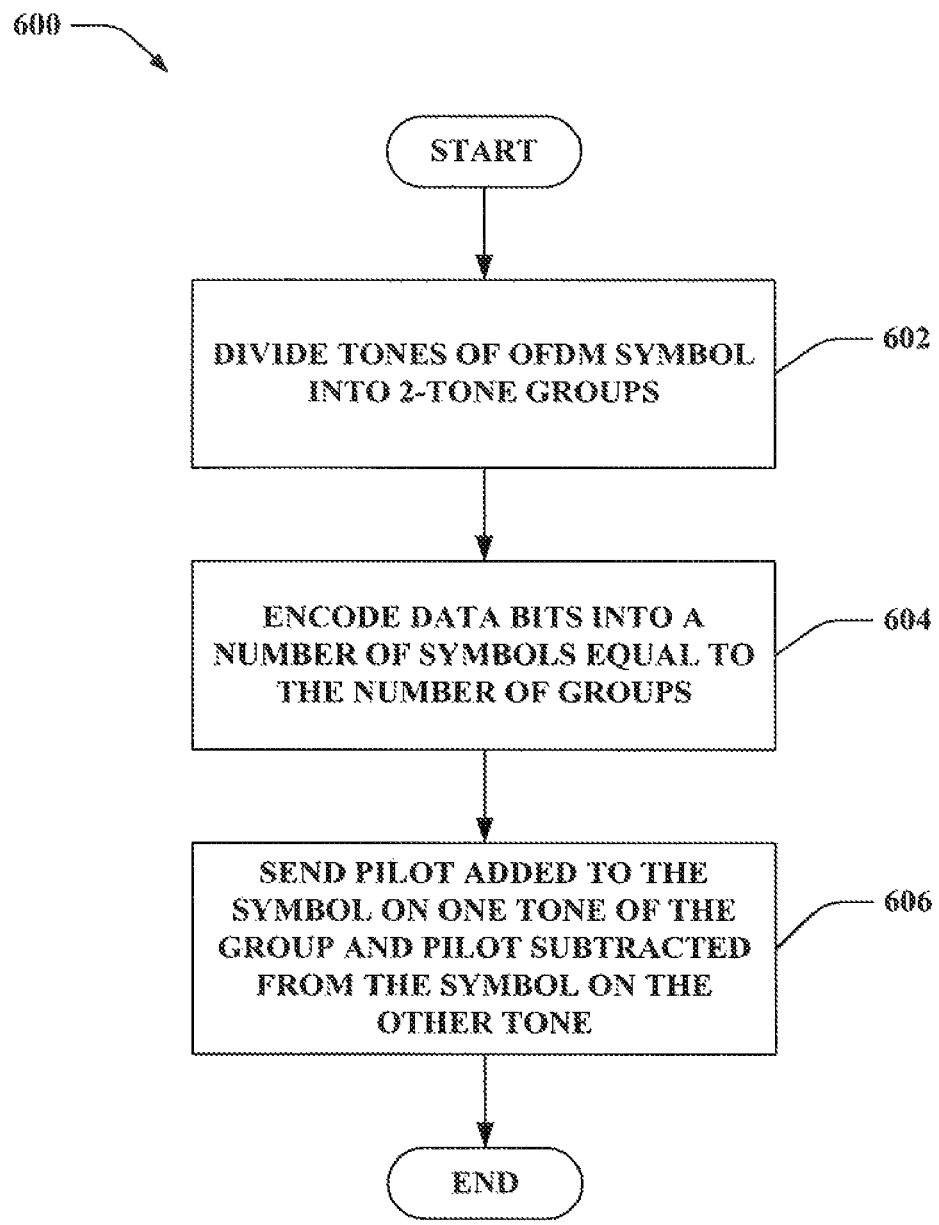
FIG. 6 is an illustration of an example methodology that facilitates inserting pilot signals within transmitted data.

Referring to FIGS. 5-6, methodologies relating to estimating channels and decoding data for impulsive interference networks and to multiplexing pilot signals are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, illustrated is a methodology 500 that facilitates effectively estimating channels and decoding data in impulsively interfered wireless networks. It is to be appreciated that the methodology can be performed by substantially any device communicating on a mobile network, such as a mobile device, base station, and/or the like. At 502, signal data is received as one or more OFDM symbols. In one example, some of the tones on one or more OFDM symbols can experience interference from one or more disparate communications. The interference can be impulsive such that it can be present in one symbol and not necessarily in a subsequent symbol. Thus, to account for interference in estimating channels to decode, at 504, the tones of the OFDM symbol are compared to determine one or more correlated tones.

At 506, the correlated tones are grouped into one or more subsets. Tones that are not in a subset or are in a subset having a small number of other tones, which can indicate that those tones are subject to interference since they do not correlate with those in the subset, can be disregarded or weighed less when estimating channels. At 508, the channels can be estimated for subsequent data decoding according to a subset of tones with a high probability of non-interference; the remaining tones can be disregarded or assigned a smaller weight. This method can be more efficient than averaging interference over the tones because of the impulsive nature of the interference as shown supra; also, if no channels are interfered, the method is effective in producing a subset for channel estimating comprising substantially all tones of the OFDM symbol. Moreover, if the channels are encoded as shown in FIG. 6, multiplexed data and pilot can be separated by adding and subtracting the pilot from the signal.

Now referring to FIG. 6, a methodology 600 that facilitates multiplexing data and pilot on multiple tones is illustrated. Multiplexing pilot information with the data can achieve the redundancy and diversity in pilot data, which can be advantageous for decoding data and/or estimating channels in the face of interference using the techniques described herein. To achieve this functionality, at 602, tones of an OFDM symbol can be divided into 2-tone groups yielding a number of tones, m, divided by 2, groups. It is to be appreciated that differently sized groups can be used as well or instead; the two-tone group is used here to provide an example of the multiplexing. At 604, data bits to be sent can be encoded into a number of symbols (such as QPSK symbols) equal to the number of groups, m/2. Subsequently, for a given tone group, the pilot can be added to the symbol for one tone and subtracted from the symbols for the other tone of the group at 606. In this regard, a device receiving the multiplexed data can determine the pilot and data by addition and subtraction. It is to be appreciated that the multiplexing can occur on a portion of the tones if more data throughput is desired.

It will be appreciated that, in accordance with one or more aspects described herein, inferences can be made regarding selecting one or more subsets for channel estimation and/or data decoding as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to selecting a subset of tones that have a high probability of not being interfered. By way of further illustration, an inference can be made with regard to the sufficiency of selecting one subset or channel over another. For example, if subsets are ambiguous or a single subset cannot be selected based on higher probability of non-interference over another subset or channel, the competing subsets and/or channels can be decoded to determine a higher decoding metric. An inference can be made regarding which subset or channel has a higher decoding metric to determine which channels to estimate.

Figure 7:
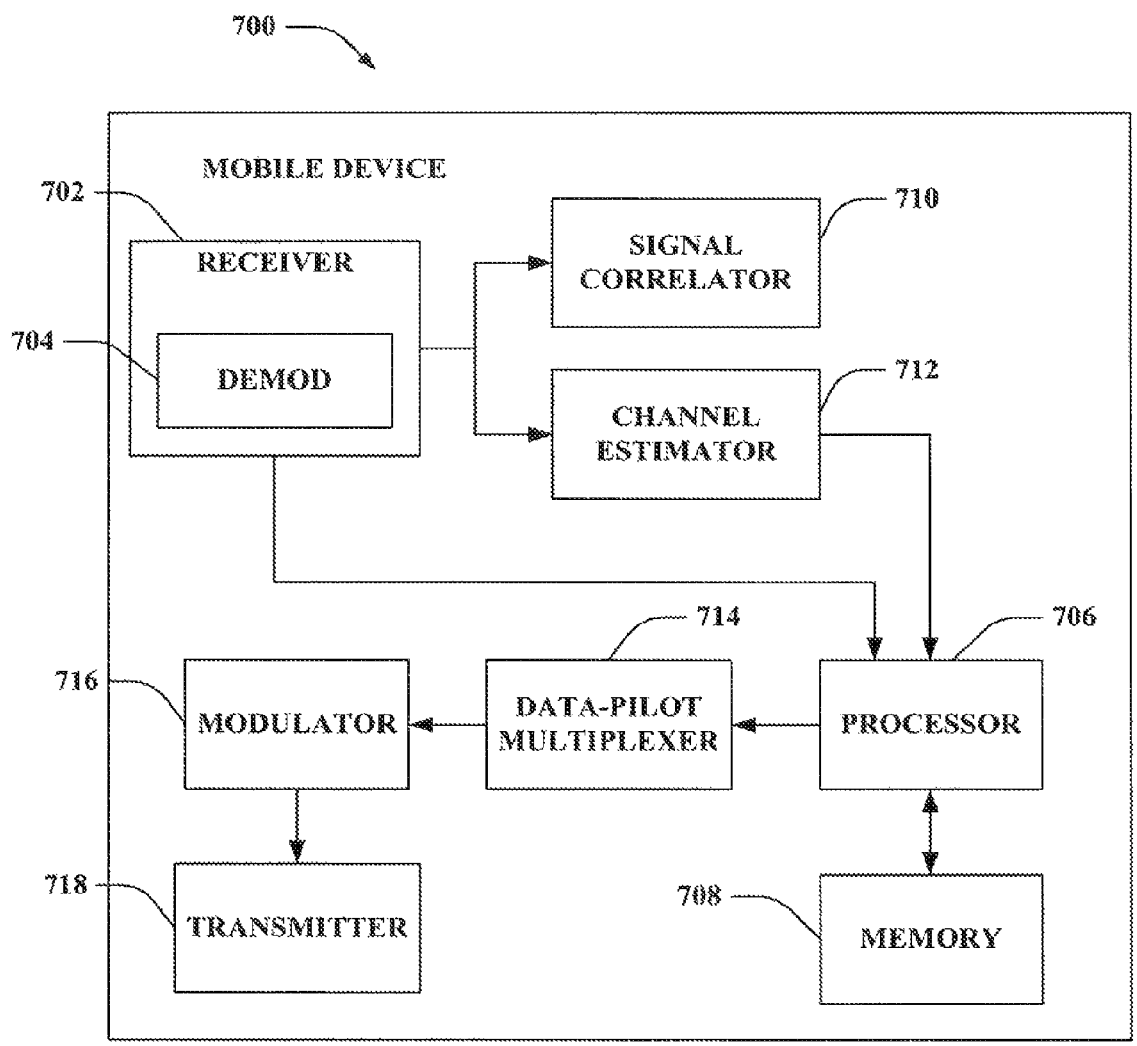
FIG. 7 is an illustration of an example mobile device that facilitates pilot insertion and estimating impulsively interfered data channels.

FIG. 7 is an illustration of a mobile device 700 that facilitates estimating channels for subsequent data decoding that can be subject to impulsive interference. Mobile device 700 comprises a receiver 702 that receives a signal from, for instance, a receive antenna (not shown), performs typical actions on (e.g., filters, amplifies, downconverts, etc.) the received signal, and digitizes the conditioned signal to obtain samples. Receiver 702 can comprise a demodulator 704 that can demodulate received symbols and provide them to a processor 706 for channel estimation. Processor 706 can be a processor dedicated to analyzing information received by receiver 702 and/or generating information for transmission by a transmitter 718, a processor that controls one or more components of mobile device 700, and/or a processor that both analyzes information received by receiver 702, generates information for transmission by transmitter 718, and controls one or more components of mobile device 700.

Mobile device 700 can additionally comprise memory 708 that is operatively coupled to processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). The memory 708 of the subject systems and methods is intended to comprise, without being limited to, these and any other suitable types of memory.

Receiver 702 and processor 706 can further be operatively coupled to a signal correlator 710 and channel estimator 712 for estimating data channels to decode in light of impulsive interference on a received signal. The receiver 702 can send demodulated data directly to the signal correlator 710 or the processor 706 can receive the data and utilize the signal correlator 710. The signal correlator 710 compares tones of a given received OFDM signal and creates subsets of correlated tones to account for impulsive interference on one or more tones of the OFDM symbol. The subsets can comprise substantially any number of tones, and tones that are not correlated such to be in the subset can be in a disparate subset or considered outlying tones, which can be disregarded in channel estimation. According to another example, the tones or subsets can be assigned a weight or confidence level such that the tones or subsets having a high probability of non-interference can be assigned a different weight from those having more uncertainty with respect to interference. The subsets and/or channels can then be applied in a calculation, for example, to determine channel estimates.

Using the subsets of tones, the channel estimator 712 can estimate channels for decoding based at least in part on the subsets of tones. For example, a subset having a large number of tones can indicate a high probability of non-interference and these tones can be used in estimating the data channels. In this regard, outlying tones can be disregarded. Additionally, where a definitive selection cannot be made regarding which tones are not likely interfered, substantially all or a portion of the subsets can be used to form channel estimates and used individually to attempt data decoding. A decoding with a high decoding metric can be chosen as the decoded data, for example. Additionally or alternatively, CRC and/or parity checking can be used to determine the metric where available.

Moreover, the mobile device 700 can have a data-pilot multiplexer 714 to multiplex pilot and data on one or more tones, as described, in outgoing communications. In this way, the receiver of transmissions by the mobile device 700 can employ similar correlation and channel estimation technology to account for impulsive interference. Specifically, the data-pilot multiplexer 714 can multiplex data and pilot information together using methods described supra to provide higher data throughput while advantageously creating redundancy and diversity in pilot signal transmission. Mobile device 700 still further comprises a modulator 716 and transmitter 718 that respectively modulate and transmit signals (such as data-pilot multiplexed signals) to, for instance, a base station, another mobile device, etc. Although depicted as being separate from the processor 706, it is to be appreciated that the signal correlator 710, channel estimator 712, data-pilot multiplexer 714, demodulator 704, and/or modulator 716 can be part of the processor 706 or multiple processors (not shown).

Figure 8:
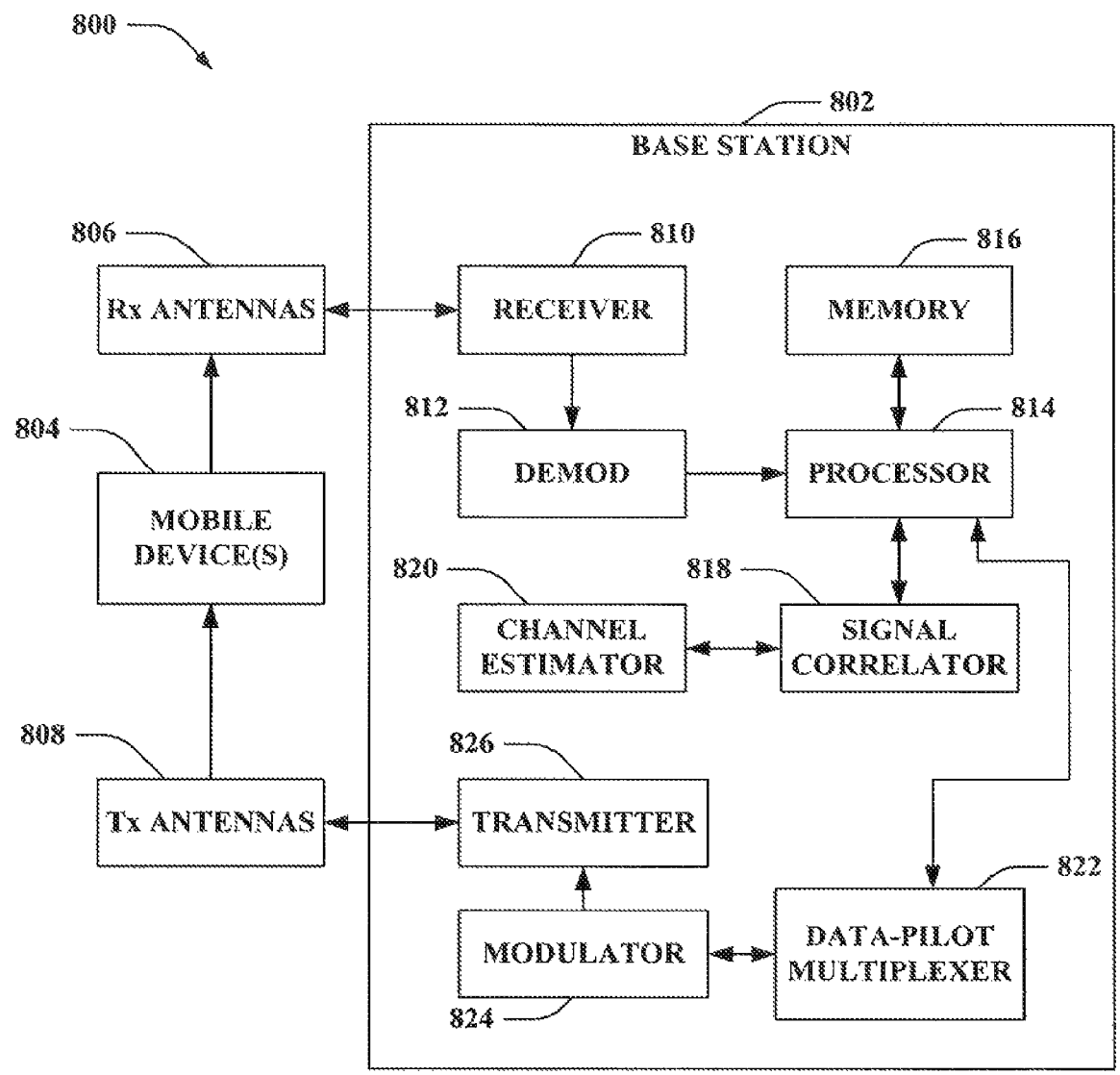
FIG. 8 is an illustration of an example system that facilitates pilot insertion and estimating impulsively interfered data channels.

FIG. 8 is an illustration of a system 800 that facilitates communicating in a peer-to-peer, ad hoc, or other wireless network subject to impulsive interference. The system 800 comprises a base station 802 (e.g., access point, . . . ) with a receiver 810 that receives signal(s) from one or more mobile devices 804 (and a demod 812 that can demodulate such signals) through a plurality of receive antennas 806, and a transmitter 826 that transmits to the one or more mobile devices 804 through a transmit antenna 808. After demodulating signals received by the receiver 810 using the demodulator 812, the processor can leverage the signal correlator 818 and channel estimator 820 to effectively estimate data channels for decoding taking interference into account. For example, the signal correlator 818 can compare portions of the signal, such as pilot tones of a one or more OFDM symbols, and create one or more subsets of correlated portions or tones. The channel estimator 820 can utilize the subsets to infer a subset of tones or portions exhibiting a high probability of non-interference. According to an example, a subset having large number of tones or portions compared to those not within the subset can indicate a high probability of non-interference as the portions or tones are correlated. Using such inferences, the channel estimator 820 can provide the channel estimates to the processor 814 for decoding, disregarding the outlying portions, tones, or subsets thereof. According to another example, the channel estimator 820 can decode one or more subsets, portions, or tones where a definitive likelihood of non-interference cannot be inferred, to find a subset having a high decoding metric.

Additionally, to allow other receiving devices to utilize similar channel estimation and decoding techniques, the base station can comprise a data-pilot multiplexer 822 that can create redundancy and diversity in pilot or beacon information as described supra. Upon multiplexing the pilot with data, the modulator 824 can modulate the multiplexed data, and the transmitter 826 can utilize one or more transmit antennas 808 to transmit or broadcast the data. Although depicted as being separate from the processor 814, it is to be appreciated that the signal correlator 818, channel estimator 820, data-pilot multiplexer 822, demodulator 812, and/or modulator 824 can be part of the processor 814 or multiple processors (not shown).

Figure 9:
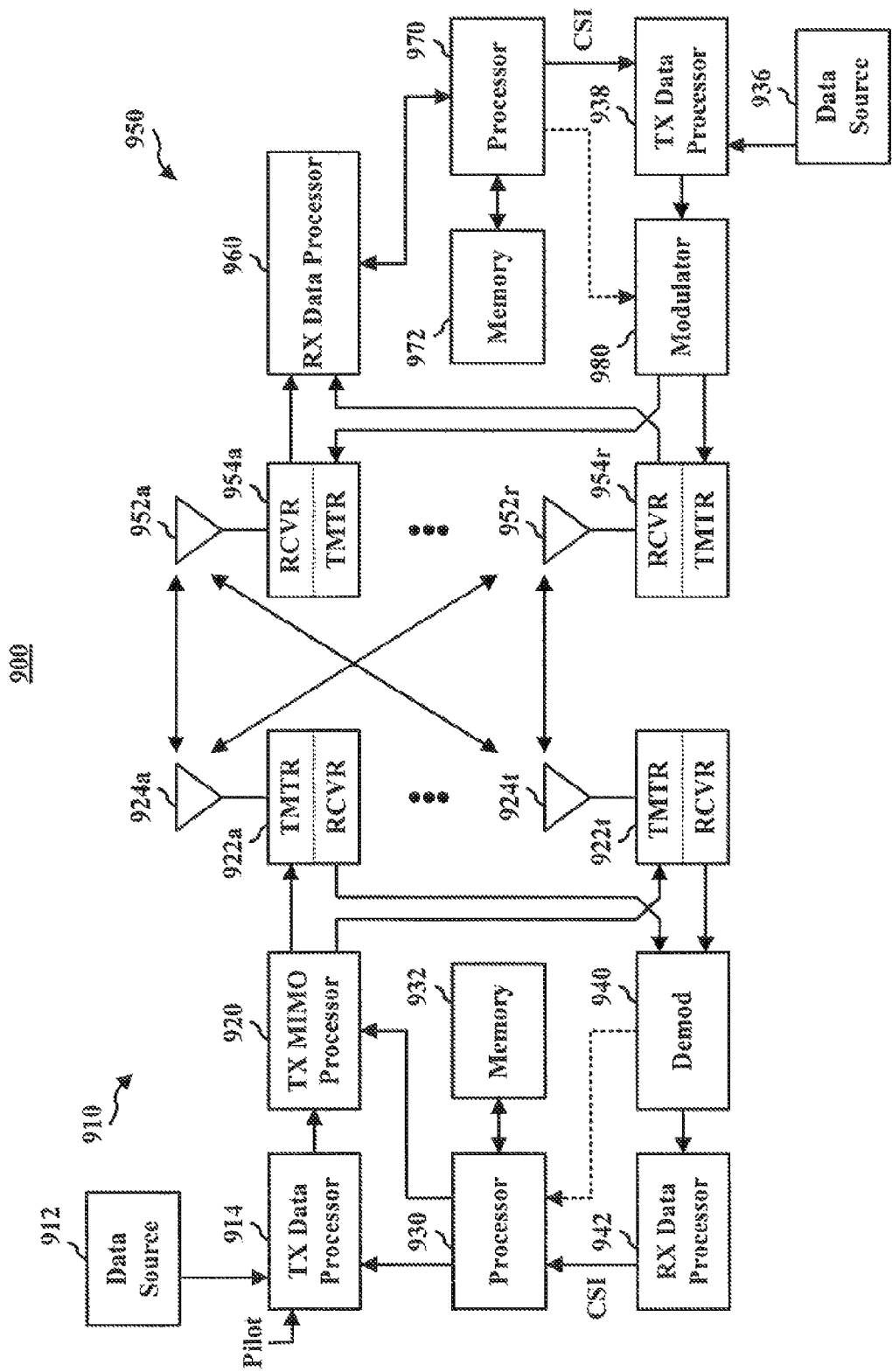
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-3 and 7-8), techniques/configurations (FIG. 4) and/or methods (FIGS. 5-6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which precoding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
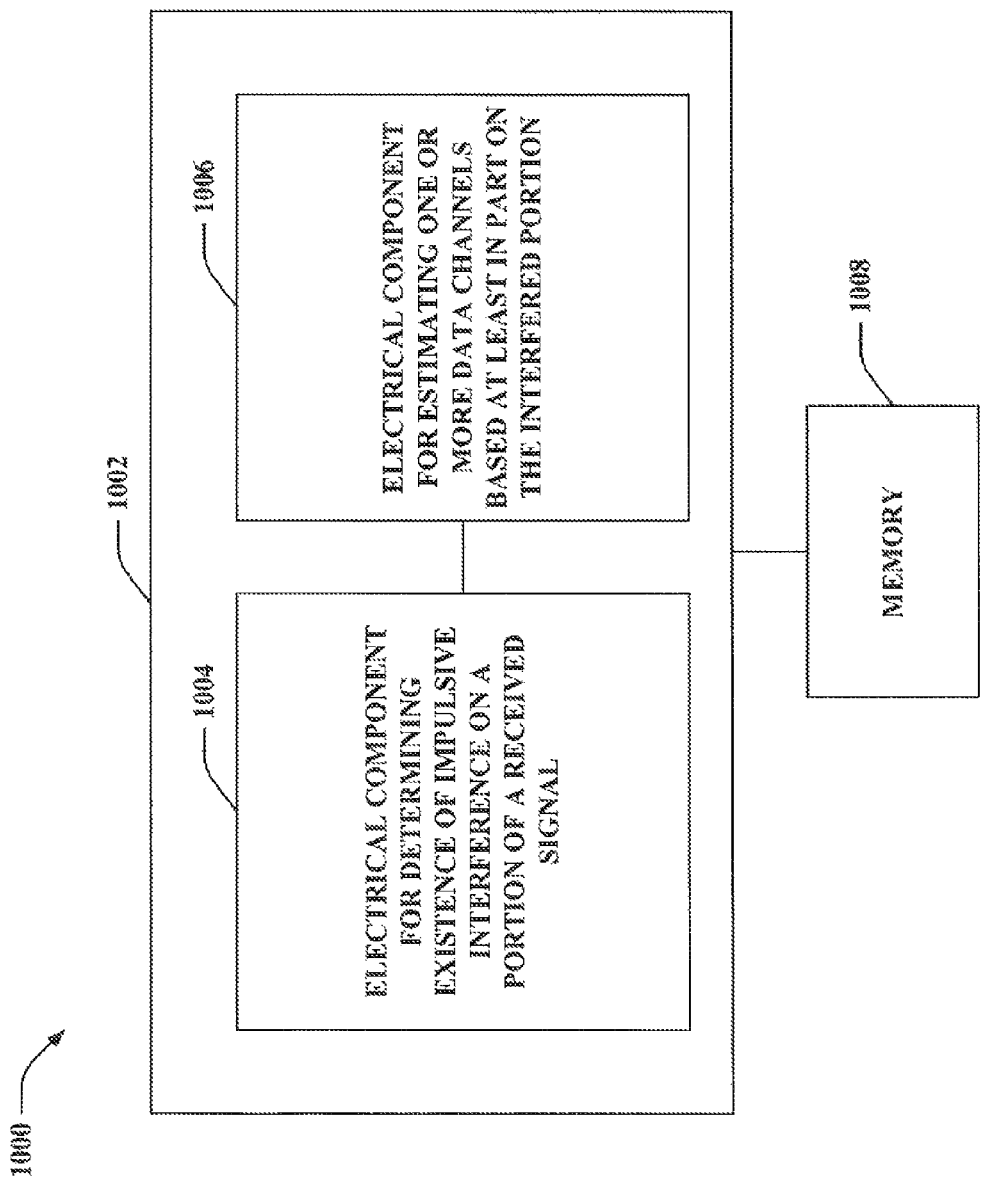
FIG. 10 is an illustration of an example system that estimates data channels in networks exhibiting impulsive interference.

With reference to FIG. 10, illustrated is a system 1000 that detects impulsive interference in ad hoc wireless communications networks and accounts for such in estimating channels for decoding. For example, system 1000 can reside at least partially within a base station, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for determining existence of impulsive interference on a portion of a received signal 1004. For example, the received signal can have impulsive interference such that the interference is not necessarily consistent among the entire signal and is not necessarily consistent over time. Thus, averaging algorithms do not provide effective interference detection and reduction for channel estimation in this case. Further, logical grouping 1002 can comprise an electrical component for estimating one or more data channels based at least in part on the interfered portion 1006. For example, based on the interfered portions, data channels can be estimated by analyzing the remaining portions, assigning weights to the portions such that the interfered portions are weighted less, etc. Additionally, system 1000 can include a memory 1008 that retains instructions for executing functions associated with electrical components 1004 and 1006. While shown as being external to memory 1008, it is to be understood that one or more of electrical components 1004 and 1006 can exist within memory 1008.

Figure 11:
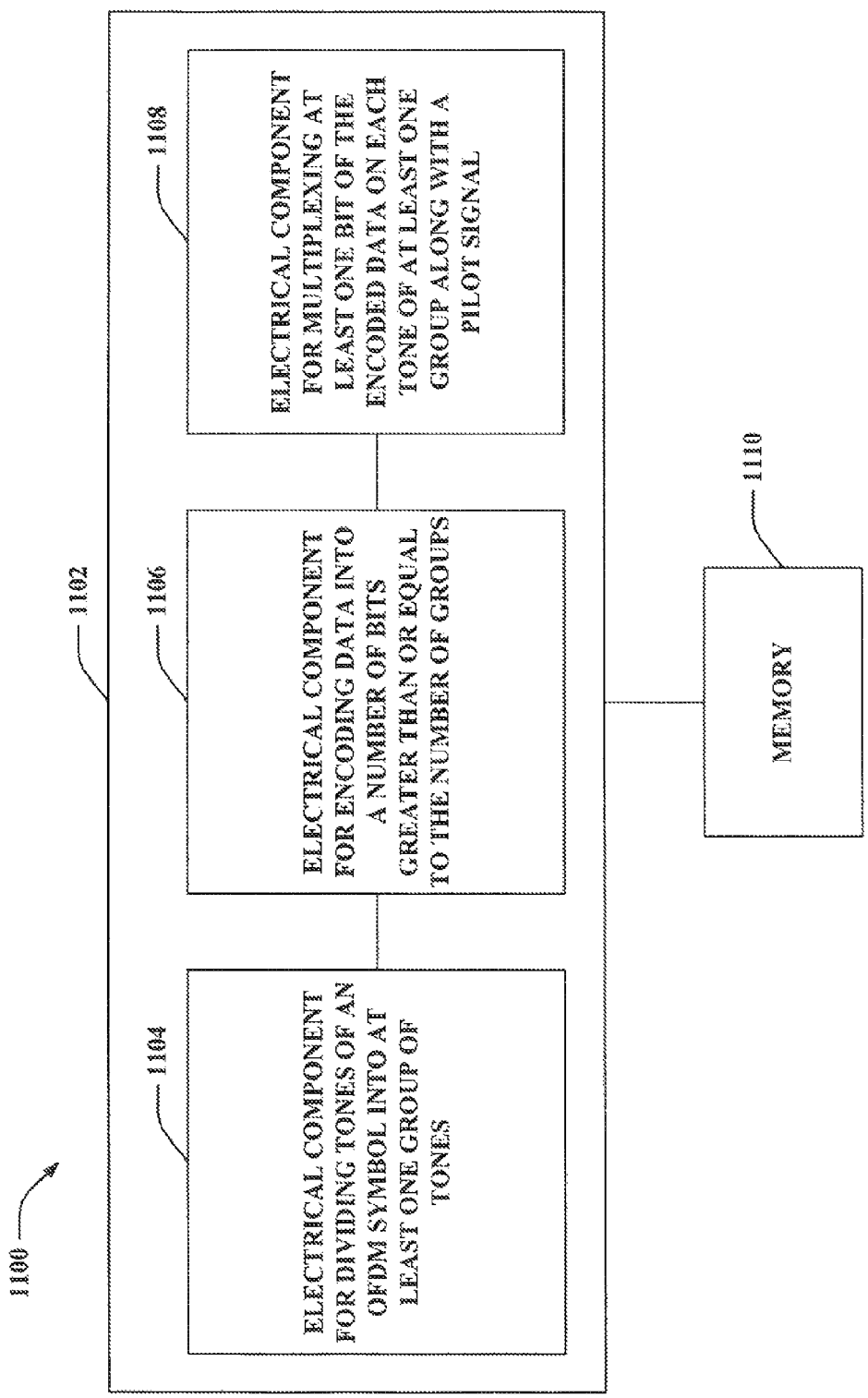
FIG. 11 is an illustration of an example system that inserts pilot signals within data for transmission over a wireless communications network.

Turning to FIG. 11, illustrated is a system 1100 that inserts pilot signals within data to be transmitted in a wireless communications network. System 1100 can reside within a base station, mobile device, etc., for instance. As depicted, system 1100 includes functional blocks that can represent functions implemented by a processor, software, or combination thereof (e.g., firmware). System 1100 includes a logical grouping 1102 of electrical components that facilitate multiplexing pilot signals with data. Logical grouping 1102 can include an electrical component for dividing tones of an OFDM symbol into at least one group of tones 1104. Thus, the bandwidth of tones for sending data is reduced as a portion of the tones are grouped. It is to be appreciated that not all tones need be part of groups if higher data throughput is desired, for example. Moreover, logical grouping 1102 can include an electrical component for encoding data into a number of bits greater than or equal to the number of groups 1106. In this regard, the data can be sent on the OFDM symbol while allowing space for transmitting the pilot data as well; there can be one data bit per group to allow effective placement of the pilot reference signal as described supra. Further, logical grouping 1102 can comprise an electrical component for multiplexing at least one bit of the encoded data on each tone of at least one group along with a pilot signal 1108. Thus, the data bit can be multiplexed over tones of a group to allow efficient decoding of the data and pilot signal. For example, the pilot signal can be added to the data bit on one tone of the group and subtracted from the data bit on another tone of the group. Subsequently, a receiver of the data can discern the data and pilot signal by addition and subtraction. Additionally, system 1100 can include a memory 1110 that retains instructions for executing functions associated with electrical components 1104, 1106, and 1108. While shown as being external to memory 1110, it is to be understood that electrical components 1104, 1106, and 1108 can exist within memory 1110.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for channel estimating in a wireless communications network, comprising:
    detecting existence of interference on one or more OFDM symbol-tone portions of a received signal;
    estimating one or more channels based at least in part on the detection of one or more interfered OFDM symbol-tone portions of the received signal; and
    combining non-interfered OFDM symbol-tone portions of the received signal into one or more subsets based at least in part on the interfered portions, wherein the one or more channels are estimated by assigning a first weight to the one or more interfered portions and a second weight to the one or more subsets based at least in part on inferring a likelihood of interference, the first weight being less than the second weight,
    wherein the received signal comprises at least one OFDM symbol and the interfered portions are one or more outlying tones of the OFDM symbol detected upon comparing the tones of the OFDM symbol to each other.

2. The method of claim 1, further comprising estimating a channel based at least in part on averaging the non-interfered portions.

3. The method of claim 1, further comprising obtaining a pilot portion from the received signal.

4. The method of claim 3, further comprising estimating the channels based at least in part on utilizing the pilot portion as a reference signal.

5. The method of claim 1, wherein the interfered portions are detected based at least in part on comparing portions of the received signal.

6. A wireless communications apparatus, comprising:
    at least one processor configured to:
        detect impulsive interference on an OFDM symbol-tone portion of a received signal;
        estimate data channels based at least in part on the detected interference; and
        combine non-interfered OFDM symbol-tone portions of the received signal into one or more subsets based at least in part on the interfered OFDM symbol-tone portions, wherein the data channels are estimated by assigning a first weight to the one or more interfered portions and a second weight to the one or more subsets based at least in part on inferring a likelihood of interference, the first weight being less than the second weight; and
    a memory coupled to the at least one processor,
    wherein the detecting impulsive interference is based at least in part on comparing one or more portions of the received signal to one or more disparate portions of the received signal, and
    wherein the signal comprises an OFDM symbol and the interference is detected based on comparing at least one tone of the OFDM symbol with at least one other tone of the OFDM symbol.

7. The wireless communications apparatus of claim 6, wherein the at least one processor is further configured to decode at least one subset along with a disparate subset and/or an interfered portion to determine a higher decoding metric.

8. The wireless communications apparatus of claim 6, wherein the at least one processor is further configured to obtain a pilot portion of the received signal.

9. The wireless communications apparatus of claim 8, wherein the at least one processor is further configured to decode the estimated channels based at least in part on utilizing the pilot portion as a reference signal.

10. A wireless communications apparatus that estimates data channels for subsequent decoding, comprising:
    means for determining existence of impulsive interference on an OFDM symbol-tone portion of a received signal;
    means for estimating one or more data channels based at least in part on the determined interfered OFDM symbol-tone portion; and
    means for combining non-interfered OFDM symbol-tone portions of the received signal into one or more subsets based at least in part on the interfered portions, wherein the one or more data channels are estimated by assigning a first weight to the one or more interfered portions and a second weight to the one or more subsets based at least in part on a likelihood of interference, the first weight being less than the second weight,
    wherein the received signal comprises one or more OFDM symbols and the impulsive interference is determined based at least in part on comparing one or more tones of the OFDM symbol with one or more disparate tones of the OFDM symbol.

11. The wireless communications apparatus of claim 10, wherein the interfered portion is determined based at least in part on comparing the interfered portion with another portion of the received signal.

12. The wireless communications apparatus of claim 10, further comprising means for decoding at least one group along with a disparate group and/or an interfered portion to determine a higher decoding metric.

13. The wireless communications apparatus of claim 10, further comprising means for obtaining a pilot portion of the received signal.

14. The wireless communications apparatus of claim 13, further comprising means for decoding the estimated channels based at least in part on utilizing the pilot portion as a reference signal.

15. A computer program product, comprising:
    a non-transitory computer-readable medium comprising:
        code for causing at least one computer to detect existence of interference on one or more OFDM symbol-tone portions of a received signal;
        code for causing the at least one computer to estimate one or more data channels based at least in part on the one or more interfered OFDM symbol-tone portions of the received signal; and
        code for causing the at least one computer to combine non-interfered OFDM symbol-tone portions of the received signal into one or more subsets based at least in part on the interfered portions, wherein the one or more data channels are estimated by assigning a first weight to the one or more interfered portions and a second weight to the one or more subsets based at least in part on a likelihood of interference, wherein the first weight is less than the second weight,
    wherein the received signal comprises at least one OFDM symbol and the interfered portions are one or more outlying tones of the OFDM symbol detected upon comparing the tones of the OFDM symbol to each other.

16. A wireless communication apparatus, comprising:
    a processor configured to:
        determine existence of impulsive interference on an OFDM symbol-tone portion of a received signal;
        estimate one or more data channels based at least in part on the interfered OFDM symbol-tone portion; and
        combine non-interfered OFDM symbol-tone portions of the received signal into one or more subsets based at least in part on the interfered portions, wherein the one or more data channels are estimated by assigning a first weight to the one or more interfered portions and a second weight to the one or more subsets based at least in part on a likelihood of interference, the first weight being less than the second weight; and a memory coupled to the processor, wherein the received signal comprises at least one OFDM symbol and the interfered portions are one or more outlying tones of the OFDM symbol detected upon comparing the tones of the OFDM symbol to each other.

* * * * *